United States Patent
Trim et al.

(10) Patent No.: US 11,687,116 B2
(45) Date of Patent: Jun. 27, 2023

(54) INTELLIGENT USER EQUIPMENT CENTRAL PROCESSING UNIT CORE CLOCK ADJUSTMENT

(71) Applicant: International Business Machines Corporation, Armonk, NY (US)

(72) Inventors: Craig M. Trim, Ventura, CA (US); Lakisha R. S. Hall, Upper Marlboro, MD (US); Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 17/010,792

(22) Filed: Sep. 2, 2020

(65) Prior Publication Data

US 2022/0066499 A1    Mar. 3, 2022

(51) Int. Cl.
*G06F 1/08* (2006.01)
*G06N 20/00* (2019.01)
(Continued)

(52) U.S. Cl.
CPC .............. *G06F 1/08* (2013.01); *G06N 20/00* (2019.01); *H04W 12/06* (2013.01); *H04W 12/72* (2021.01);
(Continued)

(58) Field of Classification Search
CPC ......... G06F 1/08; G06N 20/00; H04W 12/72; H04W 12/06; H04W 72/0406; H04W 72/085; H04W 80/02; H04W 84/02
See application file for complete search history.

(56) References Cited

U.S. PATENT DOCUMENTS 5,579,353 A    11/1996  Parmenter
5,996,084 A    11/1999  Watts
(Continued)

OTHER PUBLICATIONS

"A System and Method for Smart Workload Management on Asymmetric Multicore Architectures", IP.com No. IPCOM000236928D, IP.com Electronic Publication Date: May 22, 2014I, 7 pps.
(Continued)

*Primary Examiner* — Jaweed A Abbaszadeh
*Assistant Examiner* — Gayathri Sampath
(74) *Attorney, Agent, or Firm* — Michael A. Petrocelli (57) ABSTRACT

Aspects of the present invention disclose a method for dynamically adjusting a clock speed of a core of a multicore processor of user equipment. The method includes one or more processors generating a dedicated logical channel from a user device to a multidomain service orchestration layer of a fifth generation (5G) telecom network. The method further includes collecting information of the user device through the dedicated logical channel. The method further includes identifying situational insight of the user device based at least in part on the information of the user device. The method further includes identifying determining a workload forecast of one or more cores of the user device based at least in part on the situational insight. The method further includes identifying determining a recommended central processing unit (CPU) clock speed for a CPU core of the user device based at least in part on the workload forecast.

17 Claims, 5 Drawing Sheets

(51) Int. Cl.

| | |
|---|---|
| *H04W 12/06* | (2021.01) |
| *H04W 12/72* | (2021.01) |
| *H04W 72/20* | (2023.01) |
| *H04W 72/542* | (2023.01) |
| *H04W 80/02* | (2009.01) |
| *H04W 84/04* | (2009.01) |
| *G06F 1/3209* | (2019.01) |
| *G06F 1/3215* | (2019.01) |
| *G06F 1/324* | (2019.01) |
| *G06F 1/3234* | (2019.01) |
| *H04W 12/69* | (2021.01) |

(52) U.S. Cl.
CPC ......... *H04W 72/20* (2023.01); *H04W 72/542* (2023.01); *H04W 80/02* (2013.01); *H04W 84/042* (2013.01)

(56) References Cited

U.S. PATENT DOCUMENTS

| | | | |
|---|---|---|---|
| 6,823,516 | B1 | 11/2004 | Cooper |
| 7,730,340 | B2 | 6/2010 | Hu |
| 10,492,091 | B2 | 11/2019 | Kleinbeck et al. |
| 10,492,165 | B2 | 11/2019 | Bar-Shalom et al. |
| 2007/0032254 | A1* | 2/2007 | Chen .................. H04W 16/14 455/509 |
| 2018/0121222 | A1* | 5/2018 | Sharma ............... G06F 9/45558 |
| 2018/0234941 | A1* | 8/2018 | Kim .................... H04W 76/27 |
| 2019/0196640 | A1 | 6/2019 | Yu |
| 2019/0272002 | A1* | 9/2019 | Seenappa ............... G06F 1/324 |
| 2019/0379530 | A1* | 12/2019 | Suthar .................... H04L 12/14 |

OTHER PUBLICATIONS

"Determining Priority Value of Processes Based on Usage History", IP.com No. IPCOM000252344D, IP.com Electronic Publication Date: Jan. 5, 2018, 39 pps.

"The Benefits of Multiple CPU Cores in Mobile Devices", Whitepages, Nvidia, 23 pps., <https://www.nvidia.com/content/PDF/tegra_white_papers/Benefits-of-Multi-core-CPUs-in-Mobile-Devices_Ver1.2.pdf>.

"X86 Based Switching and Management for High Bandwidth Network Functions Virtualization (NFV) Applications", IP.com No. IPCOM000247853D, IP.com Electronic Publication Date: Oct. 6, 2016, 12 pps.

Challita et al., "When Machine Learning Meets Wireless Cellular Networks: Deployment, Challenges and Applications", Nov. 8, 2019, 7 pps.

Kafle et al. "Consideration on Automation of 5G Network Slicing With Machine Learning", Conference Paper, Nov. 2018, 9 pps.

Mao et al., "A Survey on Mobile Edge Computing: the Communication Perspective", Jun. 13, 2017, 37 pps.

Weedmark, "How to Change the Processor Speed", updated Jan. 28, 2019, Chron, 3 pps., <https://smallbusiness.chron.com/change-processor-speed-58427.html>.

Mell et al., "The NIST Definition of Cloud Computing", National Institute of Standards and Technology, U.S. Department of Commerce, NIST Special Publication 800-145, Sep. 2011, 7 pages.

* cited by examiner

INTELLIGENT USER EQUIPMENT CENTRAL PROCESSING UNIT CORE CLOCK ADJUSTMENT

BACKGROUND OF THE INVENTION

The present invention relates generally to the field of wireless communication networks and more specifically to adjusting a clock speed of a core of a multicore processor of user equipment and delivery apparatus in a fifth-generation network.

With the enablement of fifth generation (5G) cellular mobile communications, one aspect of 5G that will impact the most consumers, EMBB (Enhanced Mobile Broadband) provides faster wireless connections and extends cellular coverage, including previously underserved areas. EMBB also supports more devices and more data in dense locales and enables high-bandwidth applications such as augmented and virtual reality. Use cases for EMBB focus on content and speed, and enhance dynamic network configuration and management, placing reception and speed where needed. Increased bandwidth, massive Internet of things (IoT) data and lower latency are all incremental improvements over previous generation wireless networking, but impact will be muted without network slicing.

Software-defined networking (SDN) and network functions virtualization (NFV) play a role in 5G to scale networks quickly. SDN carves virtual "sub-networks" or slices that can be then used for bigger bandwidth applications. 5G networks use a system of cell sites that divide their territory into sectors and send encoded data via radio waves. Each cell site is connected to a network backbone via wired or wireless connections. 5G may also transmit over unlicensed frequencies currently used for Wireless-Fidelity (Wi-Fi), without conflicting with existing Wi-Fi networks.

Thus, 5G networks are more likely to be networks of small cells, even down to the size of home routers rather than huge towers radiating great distances. This small cell size is partly due to the frequencies used, but also is used to expand network capacity. For example, the more cells that exist in a network, the more data that can enter the network. As a result, 5G networks need to be smarter than previous systems because 5G networks manage an increased number of smaller cells that can change in size and shape.

SUMMARY

Aspects of the present invention disclose a method, computer program product, and system for dynamically adjusting a clock speed of a core of a multicore processor of user equipment. The method includes one or more processors generating a dedicated logical channel from a user device to a multidomain service orchestration layer of a fifth generation (5G) telecom network. The method further includes one or more processors collecting information of the user device through the dedicated logical channel. The method further includes one or more processors identifying situational insight of the user device based at least in part on the information of the user device. The method further includes one or more processors identifying determining a workload forecast of one or more cores of the user device based at least in part on the situational insight. The method further includes one or more processors identifying determining a recommended central processing unit (CPU) clock speed for a CPU core of the user device based at least in part on the workload forecast.

DETAILED DESCRIPTION

Embodiments of the present invention allow for intelligent conditional modification of central processing unit (CPU) clock cycles of one or more cores of user equipment using common control channel (CCCH) controls in a fifth generation (5G) telecom network to deliver better performance and power utilization of user equipment. Embodiments of the present invention initiate a secured dedicated 5G logical channel for artificial intelligence (AI) based dynamic clock manager based on user equipment device subscribed services to a virtual network function (VNF) and end-to-end (E2E) domain and retrieving information from user equipment devices. Embodiments of the present invention utilize the retrieved information to identify required CPU clock speed for each core of the user equipment device.

Additionally, embodiments of the present invention can supersede decisions of AI based core clock manager based on a user response via speech-to text conversion or when a peer service emergency interrupt is received. Additional embodiments of the present invention recommend to the user equipment (via CCCH control frames) to change processing clock cycles for one or more cores to an articulated clock speed based on articulated workload insights and forecasting.

Some embodiments of the present invention recognize that CPU clocks of multicore processors are static and that mechanisms known in the art are only capable of configuring cores of multicore processors at the same time based on power consumption, life, and average performance characteristics that cannot be modified dynamically. For example, because of static core CPU clock speed, certain applications can suffer processing bottlenecks in emergency situations, which can lead to hazardous consequences like data loss or application state crash. However, hardware capabilities can increase the CPU clock speed to avoid these penalties, but embodiments of the present invention recognize that no mechanism is available for modifying the CPU clock speeds of cores independently and dynamically.

Alternatively, in situations where a core is inactive (e.g., idle state) and does not require current CPU clock speed, embodiments of the present invention recognize that no mechanism is available in the art to decrease the current CPU clock speed to save the battery backed device power by underclocking some of the inactive core in the user equipment device. Various embodiments of the present invention provide a mechanism working in 5G network that detects emergency situations and changes one or more core clock speeds to accommodate a situational computational need.

Various embodiments of the present invention can operate to optimize a core clock speed of a CPU core utilizing machine learning techniques. As a result of optimized core clock speed, battery life and life of processor cores are improved due to reduced unnecessary use. Embodiments of the present invention can operate to prevent bottlenecks and increase computing performance in emergency situations that present invention detects in the computing system by transmitting an overclocking signal to the computing system, which addresses the emergency situations instead of a static throttling of core clocks. Additionally, embodiments of the present invention perform computation and processes off of a computing device, which does not impede performance of the computing device by appropriating computing resources of the computing device.

Implementation of embodiments of the invention may take a variety of forms, and exemplary implementation details are discussed subsequently with reference to the Figures. Various embodiments will be described in more detail with reference to the Figures, in which embodiments of the present invention has been illustrated.

Some embodiments will be described in more detail with reference to the accompanying drawings, in which the embodiments of the present invention have been illustrated. However, the present invention can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by multiple organizations and supports a specific community that has shared concerns (e.g., mission, security requirements, policy, and compliance considerations). The cloud community cloud may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
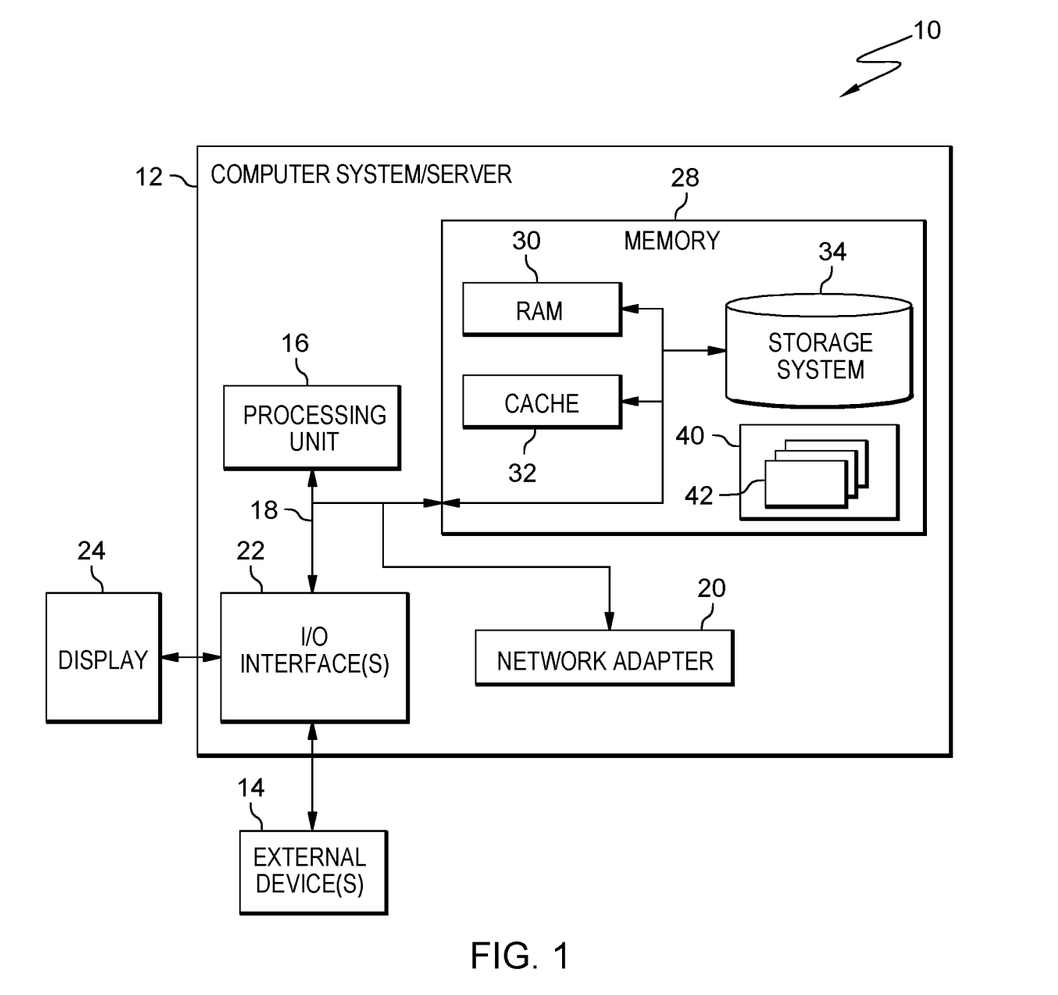
FIG. 1 depicts a cloud computing node, in accordance with an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units, a system memory 28, and a bus 18 that couples various system components including system memory 28 to processor 16.

Bus 18 represents one or more of any of multiple types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
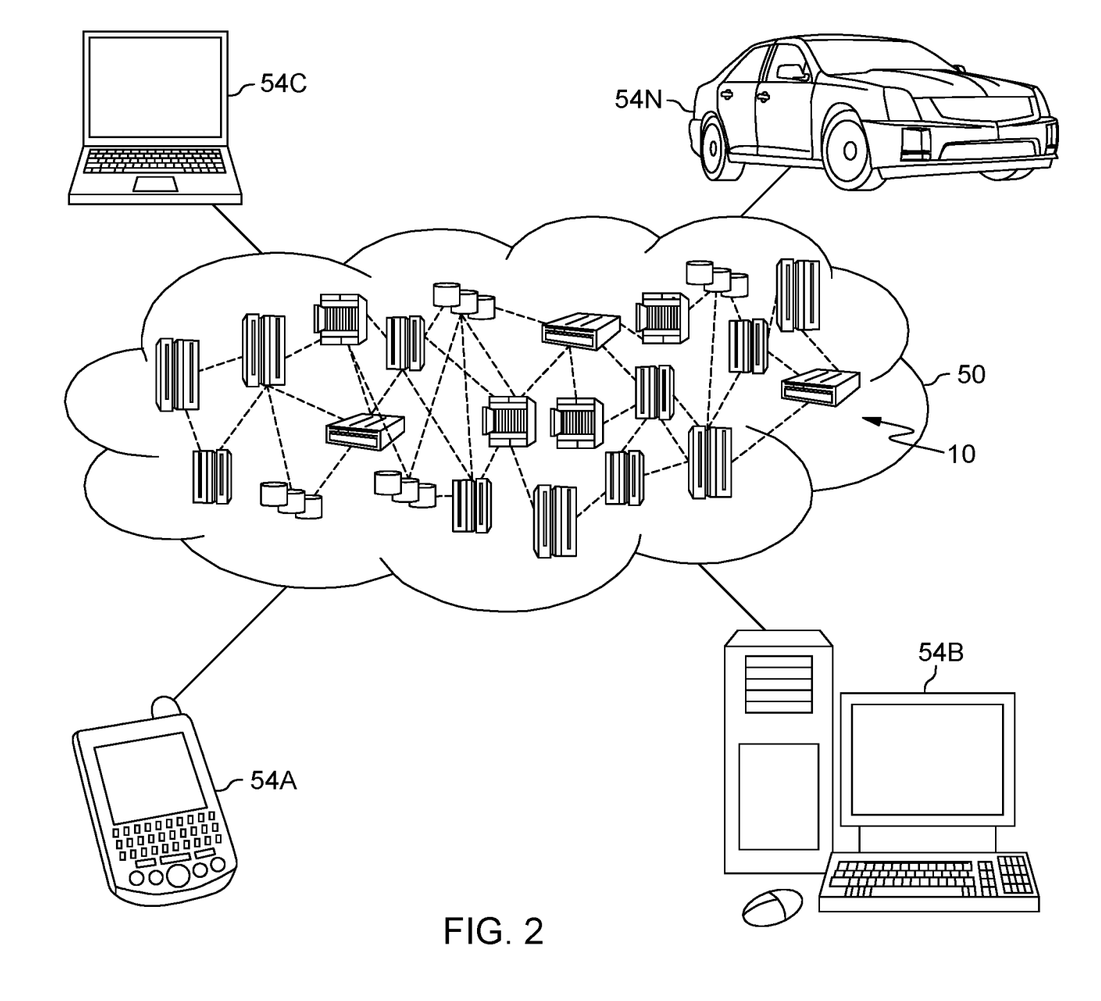
FIG. 2 depicts a cloud computing environment, in accordance with an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network (e.g., 5G) and/or network addressable connection (e.g., using a web browser).

Figure 3:
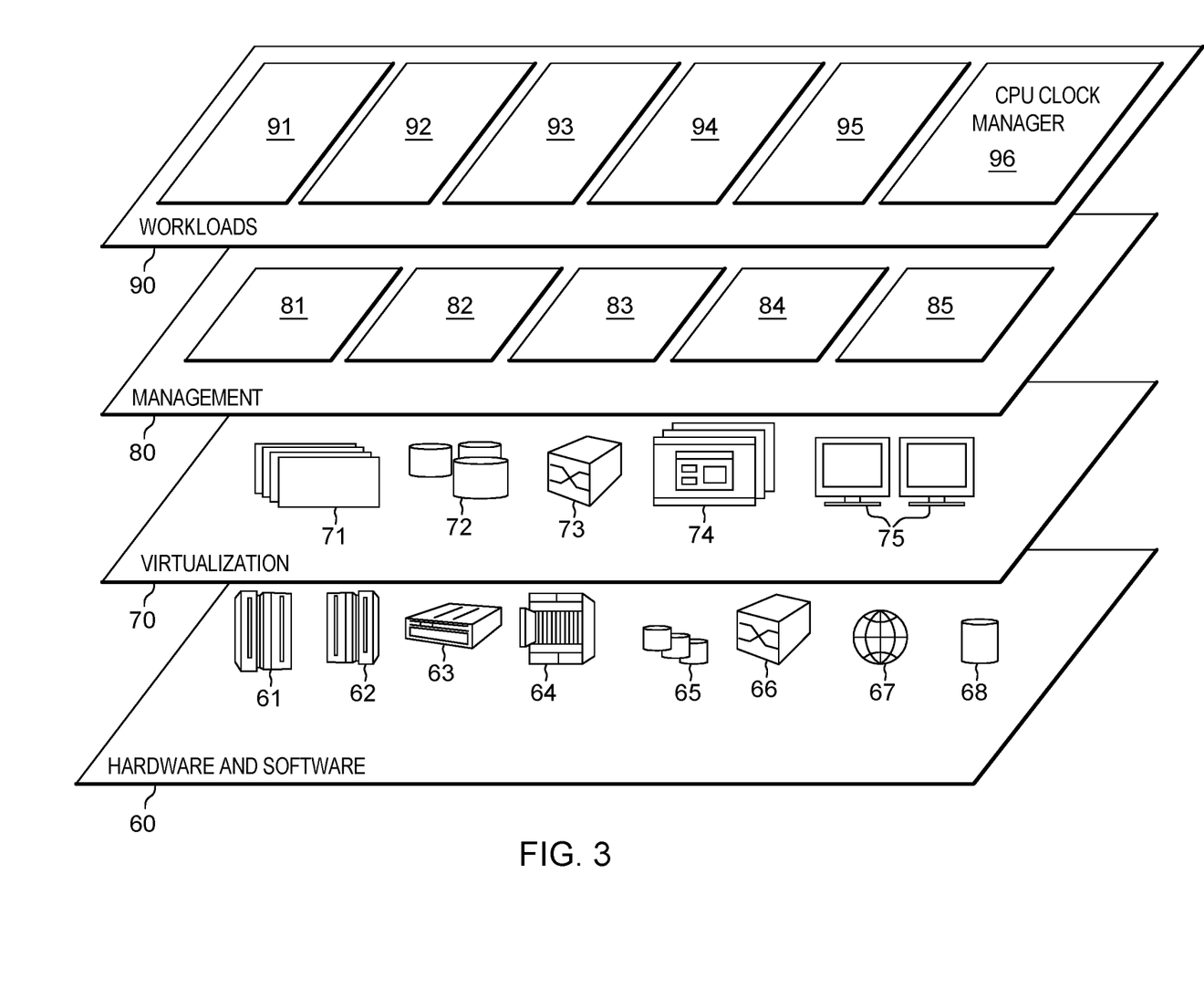
FIG. 3 depicts abstraction model layers, in accordance with an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analysis processing 94; transaction processing 95; and central processing unit (CPU) clock manager 96. While CPU clock manager 96 is shown in FIG. 3 to reside in workloads layer 90, CPU clock manager 96 can span all of the levels shown in FIG. 3, as discussed below.

Figure 4:
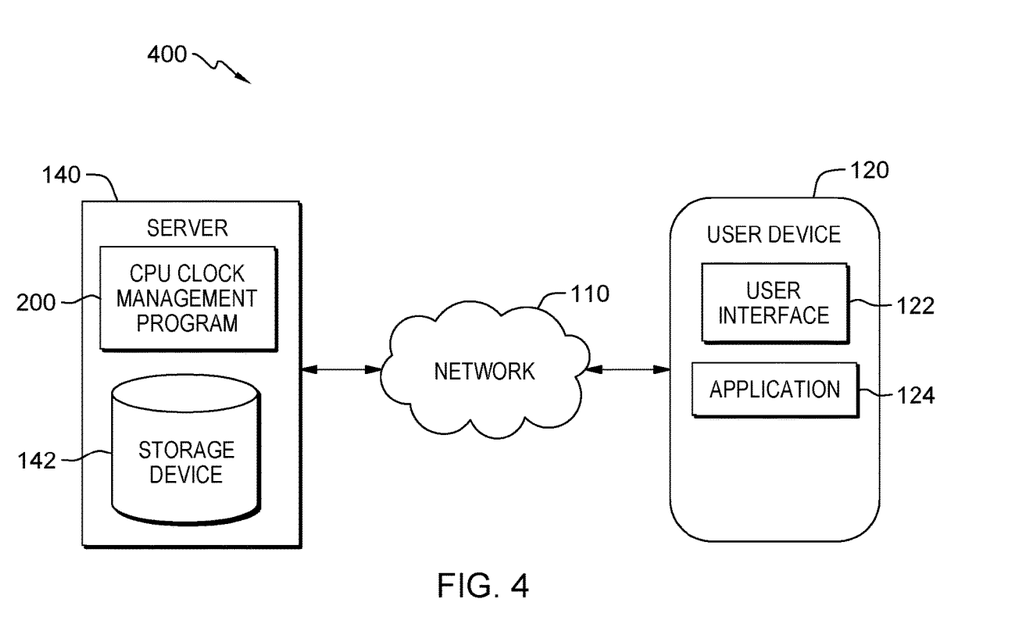
FIG. 4 is a functional block diagram of a data processing environment, in accordance with an embodiment of the present invention.

The present invention will now be described in detail with reference to the Figures. FIG. 4 is a functional block diagram illustrating a distributed data processing environment, generally designated 400, in accordance with one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as client device 120, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. CPU clock management program 200 enables the authorized and secure processing of personal data. CPU clock management program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. CPU clock management program 200 provides information regarding personal data and the nature (e.g., type, scope, purpose, duration, etc.) of the processing. CPU clock management program 200 provides the user with copies of stored personal data. CPU clock management program 200 allows the correction or completion of incorrect or incomplete personal data. CPU clock management program 200 allows the immediate deletion of personal data.

Distributed data processing environment 400 includes server 140 and user device 120, all interconnected over network 110. Network 110 can be, for example, a telecommunications network, a local area network (LAN), a municipal area network (MAN), a wide area network (WAN), such as the Internet, or a combination of the three, and can include wired, wireless, or fiber optic connections. Network 110 can include one or more wired and/or wireless networks (e.g., 5G) capable of receiving and transmitting data, voice, and/or video signals, including multimedia signals that include voice, data, and video information. In general, network 110 can be any combination of connections and protocols that will support communications between server 140, user device 120, and other computing devices (not shown) within distributed data processing environment 400.

In addition, it should be noted that distributed data processing environment 400 may include any number of additional servers, clients, storage devices, and other devices not shown. Program code located in distributed data processing environment 400 may be stored on a computer readable storage medium and downloaded to a computer or other data processing device for use. For example, program code may be stored on a computer readable storage medium on server 140 and downloaded to user device 120 over network 110 for use on user device 120. In the depicted example, distributed data processing environment 400 may be implemented as a number of different types of communication networks, such as, for example, a 5G telecommunications network, a radio access network, an optical fixed access network, an internet, an intranet, a local area network (LAN), a wide area network (WAN), a wireless fidelity (Wi-Fi) network, or any combination thereof. In alternative embodiment, network 110 may refer to components as depicted in FIG. 2, such as, for example, cloud computing environment 50, in accordance with embodiments of the present invention. FIG. 4 is intended as an example only, and not as an architectural limitation for the different illustrative embodiments.

User device 120 can be one or more of a laptop computer, a tablet computer, a smart phone, smart watch, a smart speaker, unmanned aerial vehicle (UAV), or any programmable electronic device capable of communicating with various components and devices within distributed data processing environment 100, via network 110. In general, user device 120 represents one or more programmable electronic devices or combination of programmable electronic devices capable of executing machine readable program instructions and communicating with other computing devices (not shown) within distributed data processing environment 100 via a network, such as network 110. User device 120 may include components as depicted in FIG. 1, in accordance with embodiments of the present invention. In alternative embodiment, user device 120 may refer to components as depicted in FIG. 2, such as, for example, personal digital assistant (PDA) or cellular telephone 54A, desktop computer 54B, laptop computer 54C, and/or automobile computer system 54N, in accordance with embodiments of the present invention.

User device 120 may include one or more processors, user interface 122 and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 can be a computer program designed to run on user device 120. An application frequently serves to provide a user with similar services accessed on personal computers (e.g., web browser, playing music, or other media, etc.). In one embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of CPU clock management program 200. Alternatively, application 124 is a client-side application of CPU clock manager 96.

In another embodiment, application 124 is a local application of user device 120. For example, application 124 can be a network services application that is a daemon that connects to a computer network, which is an application running at the network application layer and above, that provides data storage, manipulation, presentation, communication or other capability which is often implemented using a client-server or peer-to-peer architecture based on application layer network protocols. In another example, application 124 is a data collector that collects local hardware information (e.g., CPU, number of cores, supported clock speeds, etc.) and dynamic information (e.g., running applications, background application schedules, battery power, CPU utilization, etc.) of user device 120.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted in FIG. 1, in accordance with embodiments of the present invention. In alternative embodiment, user device 120 may refer to components as depicted in FIG. 2, such as, for example, cloud computing node 10, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with user device 120 and other computing devices (not shown) within distributed data processing environment 400 via network 110. In another embodiment, server 140 represents a computing system utilizing clustered computers and components (e.g., database server computers, application server computers, etc.) that act as a single pool of seamless resources when accessed within distributed data processing environment 400.

Server 140 includes storage device 142 and CPU clock management program 200. Storage device 142 can be implemented with any type of storage device, for example, system memory 28, which is capable of storing data that may be accessed and utilized by server 140, such as a database server, a hard disk drive, or a flash memory. In one embodiment storage device 142 can represent multiple storage devices within server 140. In various embodiments of the present invention, storage device 142 stores a plurality of information. For example, storage device 142 may include one or more organized collections of data stored and accessed from server 140. In this example, storage device 142 includes a knowledge base, local hardware information (e.g., CPU, number of cores, supported clock speeds, etc.), dynamic information (e.g., running applications, background application schedules, battery power, CPU utilization, service access patterns of a user, etc.), and/or clock speed recommendations. In one embodiment, data processing environment 400 can include additional servers (not shown) that host additional information that accessible via network 110.

In various embodiments of the present invention CPU clock management program 200 provides a mechanism, which detects emergency situations and modifies a core clock frequency of one or more cores of user equipment to accommodate situational computational needs of the user equipment. Additionally, CPU clock management program 200 can reside in a multidomain service orchestration layer and programmability framework of a 5G telecom network.

In one embodiment, CPU clock management program 200 collects information of user device 120. For example, CPU clock management program 200 retrieves local hardware information (e.g., CPU, number of cores, supported clock speeds, etc.) from a mobile device (e.g., user device 120) via a secured dedicated 5G logical channel (e.g., network 110). In this example, CPU clock management program 200 retrieves local dynamic information (e.g., running applications, background application schedules, CPU utilization and other interrelated device stats like battery power, etc.) from the mobile device via the secured dedicated 5G logical channel and stores them in a memory device (e.g., storage device 142) that includes a metadata mapper. In various embodiments, a metadata mapper connects one set of metadata elements and/or fields (e.g., running applications, background application schedules, etc.) of the mobile device with operational requirements required by the applications.

Additionally, CPU clock management program 200 retrieves a subscription list of services of the user equipment and identifies operational requirements of the services (i.e., service X needs high computing power with low IO timeout, while service B has more timeout values and less processing). Moreover, CPU clock management program 200 utilizes the metadata mapper to associate one set of metadata elements or fields of dynamic information to the equivalent elements in systems or information assets (e.g., subscription list of services).

In another embodiment, CPU clock management program 200 recommends a CPU clock speed for one or more cores of user device 120. For example, CPU clock management program 200 uses a stream-based classifier and machine learning algorithm models to infer dynamic insight about hardware and software services utilization of a mobile device (e.g., user device 120) of a user to recommend a CPU clock speed of one or more cores of the mobile device based on collected information (e.g., local dynamic information, local hardware information, etc.) of the mobile device.

In another embodiment, CPU clock management program 200 utilizes network 110 to transmit a recommended CPU clock speed to user device 120. For example, CPU clock management program 200 transmits a recommended CPU clock speed to a mobile device (e.g., user device 120) via 5G telecom network (e.g., network 110). In this example, CPU clock management program 200 generates a CCCH control message that includes the recommended CPU clock speed and identifier (e.g., temporary mobile subscriber identity (TMSI) number, international mobile subscriber identity (IMSI) number, universally unique identifier (UUID), etc.) of the mobile device via the 5G telecom network that traverses the S1 bearer to radio bearer to reach to the mobile device based on the identifier, which is utilized to validating authentication of one or more device utilizing the channel (e.g., CCCH) of the 5G telecom network to ensure delivery of the CCCH control message to the mobile device.

In an alternative example, CPU clock management program 200 transmits a recommended CPU clock speed to a virtual network function (VNF) using an in-bound 5G-communication channel, which transmits the CCCH control message to the mobile device. In this alternative example, the VNF can reside within a virtualized (e.g., abstraction layer) of a computing device (e.g., server 140) or in a layer of the 5G telecom network in which the computing device is a component.

In another embodiment, CPU clock management program 200 confirms modification of a CPU clock speed of user device 120. In various embodiments of the present invention if user equipment has enabled auto allow mode, then a CPU core clock frequency (e.g., CPU clock speed) is modified based on a received recommendation and a signal is made to an operating system (OS) of the user equipment. Additionally, the signal to the OS allows for scheduling of a running application based on the recommended clock speed and generates an acknowledgment message. In this example, CPU clock management program 200 parses the acknowledgement message and updates training data to the classification model that improve triggering and recommendations based on historical data.

In yet another embodiment, CPU clock management program 200 identifies emergency situations of user device 120. For example, CPU clock management program 200 detects a mobile device (e.g., user device 120) requires more computational demand for a defined time period (e.g., an emergency) and overrides a recommended clock speed based on the required computational demands of the mobile device to handle an emergency situation (e.g., collecting instant application data/state dumps, emergency cloud data migration, etc.).

Figure 5:
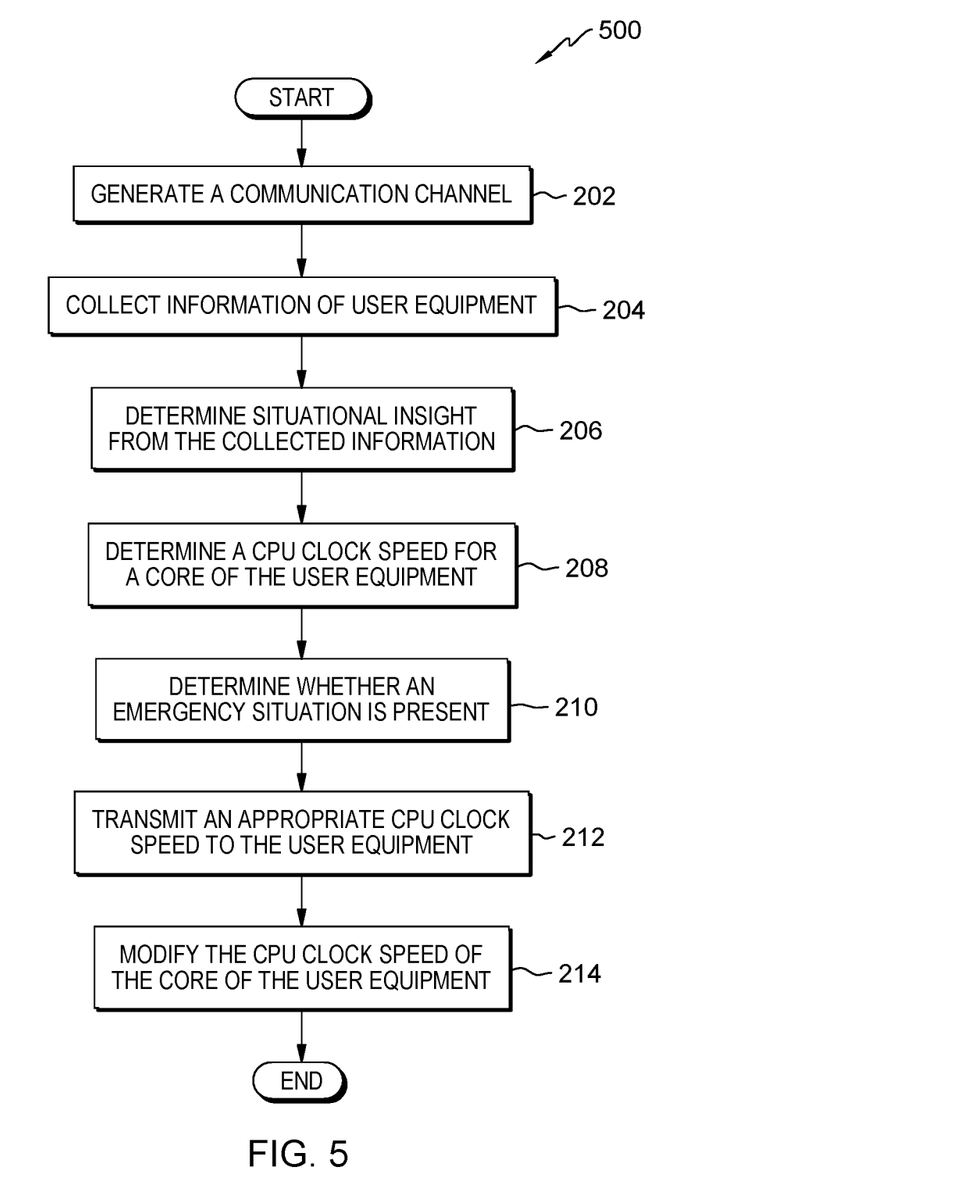
FIG. 5 is a flowchart depicting operational steps of a program for dynamically adjusting a clock speed of a core of a multicore processor of user equipment, in accordance with embodiments of the present invention.

FIG. 5 is a flowchart depicting operational steps of CPU clock management program 200, a program for dynamically adjusting a clock speed of a core of a multicore processor of user equipment, in accordance with embodiments of the present invention based on time, situation and nature of the environmental constrains. In one embodiment, CPU clock management program 200 initiates in response to user device 120 registering with CPU clock management via network 110. For example, CPU clock management program 200 initiates in response to a mobile device (e.g., user device 120) transmitting an authentication request to CPU clock management in a component of a 5G telecom network (e.g., network 110). In another embodiment, CPU clock management program 200 initiates in response to application 124 of user device 120. For example, CPU clock management program 200 is a client-side background application (e.g., application 124) that initiates in response a boot request of a mobile device (e.g., user device 120) that has powered on.

In step 202, CPU clock management program 200 generates a communication channel. In one embodiment, CPU clock management program 200 creates a communication channel for user device 120 via network 110. For example, upon a client-side application (e.g., application 124) of CPU clock management program 200 initiating on a mobile device (e.g., user device 120), the client-side application transmits a stream-based channel request to CPU clock management program 200 through a node (e.g., eNodeB) of a 5G telecom network (e.g., network 110) via a radio access protocol. Additionally, the client-side application actuates data collectors, daemons, and operating system interconnects of the mobile device and collects raw data and statistics of the mobile device. In this example, CPU clock management program 200, which can reside on a multidomain service orchestration plane of the 5G telecom network, creates a secure dedicated 5G logical channel in response to the stream-based channel request. Additionally, CPU clock management program 200 allocates a bandwidth and quality of service (QoS) Class identifier (QCI) characteristics to the secure dedicated 5G logical channel based on service subscriptions to a VNF and E2E domain.

In step 204, CPU clock management program 200 collects information of user equipment. In one embodiment, CPU clock management program 200 utilizes application 124 to collect information corresponding to user device 120. For example, CPU clock management program 200 utilizes a secure dedicated 5G logical channel (as discussed in step 202) to collect data of a stream of a mobile device (e.g., user device 120) that includes hardware information and dynamic information of the mobile device. In this example, CPU clock management program 200 can use the secure dedicated 5G logical channel to access a processing stack, operating system and other interrelated system data sources of the mobile device to collect workload history, GPS locations, battery status, calendar history and weather profiles from the user device.

In addition, CPU clock management program 200 collects local hardware information, such as platform identification, hardware specifications, model internal architecture, supported clock speed, current clock speed, number of cores, hardware default settings, and cache queue depth. Moreover, CPU clock management program 200 can collect dynamic information of the mobile device including that of an active application, operational requirements of subscribed services in a subscription list, and/or user interactions with the active application. Additionally, CPU clock management program 200 can utilize a medium access control (MAC) protocol to collect information of the mobile device via a shared 5G telecom network channel.

In another embodiment, CPU clock management program 200 maps collected information of user device 120 with a machine learning algorithm. For example, CPU clock management program 200 parses (e.g., statistical, regular expression classifier (Regex), etc.) a data stream of a mobile device (e.g., user device 120) via a secure dedicated 5G logical channel that includes collected data (e.g., local hardware information, dynamic information, etc.) and extracts fields (e.g., static and dynamic data fields the mobile device) of the collected data. In this example, CPU clock management program 200 maps the extracted fields to a training model of a machine learning algorithm (e.g., artificial neural network (ANN)) for inferring situational insight from the collected data (i.e., training a ANN to identify external circumstances, events, activities, and circumstances that impact computational requirements of the mobile device based on the collected data). Additionally, CPU clock management program 200 stores the classified collected data in a metadata mapper of a storage device (e.g., storage device 142).

In step 206, CPU clock management program 200 determines situational insight from the collected information. In one embodiment, CPU clock management program 200 classifies a real-time data stream of a communication channel of network 110 from user device 120. For example, CPU clock management program 200 uses a stream-based classifier (e.g., serial, parallel, etc.) to determine dynamic insights (i.e., estimation of near future events, application access patterns of a user, application operational requirements, available processing resources of the mobile device) about hardware and services utilized by a mobile device (e.g., user device 120). In this example, clock management program 200 determines the dynamic insights by filtering a data stream of the mobile device that includes collected information and query a metadata mapper to identify corresponding operational requirements (i.e., detecting a set of conditions that indicate a current or future workload of one or more cores of the mobile device in order to identify computational requirements of the mobile device).

In step 208, CPU clock management program 200 determines a recommended a CPU clock speed for a core of the user equipment. Various embodiments of the present invention include a mechanism to infer the dynamic insights about resource requirements and utilization of user equipment and recommend changes to processing clock cycles for certain cores based on articulated workload insights and forecasting. In one embodiment, CPU clock management program 200 utilizes situational insight from collected data of user device 120 to determine a recommended CPU clock speed for a core of user device 120. For example, CPU clock management program 200 uses dynamic insight about hardware and software services utilization of a mobile device (e.g., user device 120) of a stream-based classifier and machine learning algorithm model (e.g., ANN) to recommend a CPU clock speed of one or more cores of the mobile device. In this example, CPU clock management program 200 recommends to underclock or overclock one or more cores of the mobile using the articulated information about the mobile device and an estimation of the machine learning algorithm model with respect to anticipated events and workloads based on an application access pattern of a user and corresponding application requirements.

In one scenario, CPU clock management program 200 forecasts that a workload of a processing stack of a user of a mobile device (e.g., client device 120) will include a gaming application based on an application access patterns of the user with the mobile device. In this scenario, CPU clock management program 200 queries a metadata mapper of a database (e.g., database 144) and retrieves a minimum operational requirement (e.g., clock speed of 1.2 GHz) of the gaming application. Additionally, CPU clock management program 200 recommends a clock speed of 1.8 GHz for a core of the mobile device, based on frequent crashes of the gaming application under similarly forecasted workloads in an application history of the gaming application.

In step 210, CPU clock management program 200 determines whether an emergency situation is present. In one embodiment, CPU clock management program 200 can preempt user device 120 from modifying a clock speed based on a recommendation of CPU clock management program 200. For example, CPU clock management program 200 uses speech recognition techniques to process a verbal response from a user of a mobile device (e.g., user device 120) to detect an underclock or overclock command of the user and transmit the command to a preempt a clock speed recommendation being determined by CPU clock management program 200.

In another example, if CPU clock management program 200 receives an emergency message from a thin client of an orchestration layer of the 5G telecom network (e.g., network 110) via an API for peer services of the orchestration layer indicating an emergency situation (e.g., collecting instant application data and/or state dumps, emergency cloud data migration, etc.), then CPU clock management program 200 transmits the emergency message to the machine learning algorithm services to determine a CPU clock speed of a mobile device (e.g., user device 120) based on operational requirements of a source (e.g., service) of the emergency situation.

In step 212, CPU clock management program 200 transmits an appropriate CPU clock speed to the user equipment. In one embodiment, CPU clock management program 200 transmits a recommended CPU clock speed for one or more cores of user device 120 via network 110. For example, CPU clock management program 200 transmits a recommend CPU clock speed to a mobile device (e.g., user device 120) over a 5G telecom network (e.g., network 110). Additionally, CPU clock management program 200 generates a control message (e.g., CCCH control message) that includes an identifier (e.g., UUID, IMSI, TMSI, etc.) for the mobile device. In this example, CPU clock management program 200 utilizes a common control channel of the 5G telecom network to transmit the control message that includes the recommended CPU clock speed to edged components (e.g., eNodeB) of the 5G telecom network. Also, the control message traverses via the S1 bearer to the radio bearer in order to reach the mobile device.

In step 214, CPU clock management program 200 modifies the CPU clock speed of the core of the user equipment. In one embodiment, CPU clock management program 200 utilizes application 124 to modify a CPU clock speed of user device 120. For example, CPU clock management program 200 uses a CPU clock manager (e.g., application 124) to modify a CPU clock speed of a core of a mobile device (e.g., client device 120) and transmit a signal to an operating system of the mobile device to control scheduling of a running application based on a new clock speed. In this example, CPU clock management program 200 parses an acknowledgement message received from a client-side application (e.g., application 124), which CPU clock management program 200 can utilize to update a history and metadata mappers in order optimize learning of a machine learning algorithm model and classifiers.

In one scenario, if CPU clock management program 200 determines that an acknowledgement message includes information that indicates that a recommended CPU clock speed would exceed a core utilization threshold (e.g., clock speed cap), then CPU clock management program 200 utilizes a CPU clock manager (e.g., application 124) to set the CPU clock speed of a mobile device (e.g., user device 120) to a default setting. Additionally, CPU clock management program 200 parses an acknowledgement message and updates a machine learning algorithm model and classifiers based on information about the core utilization threshold.

What is claimed is:

1. A method comprising:
    generating, by one or more processors, a dedicated logical channel from a user device to a multidomain service orchestration layer of a fifth generation (5G) telecom network;
    collecting, by one or more processors, information of the user device through the dedicated logical channel;
    identifying, by one or more processors, situational insight of the user device based at least in part on the information of the user device, wherein the situational insight includes resource requirements and resource utilization of the user device;
    determining, by one or more processors, a workload forecast of one or more cores of the user device based at least in part on the situational insight;
    determining, by one or more processors, a recommended central processing unit (CPU) clock speed for a CPU core of the user device based at least in part on the workload forecast; and
    transmitting, by one or more processors, a common control channel (CCCH) message to the user device using a medium access control (MAC) protocol, wherein the CCCH message includes the recommended CPU clock speed.

2. The method of claim 1, further comprising:
    modifying, by one or more processors, processing clock cycles of the CPU core based at least in part on the recommended CPU clock speed;
    receiving, by one or more processors, an acknowledgement message from the user device, wherein the acknowledgement messages includes utilization information of the CPU core;
    parsing, by one or more processors, the acknowledgement message from the user device; and
    updating, by one or more processors, a machine learning algorithm based on the acknowledgment message.

3. The method of claim 1, further comprising:
    identifying, by one or more processors, a set of conditions of the user device that indicate an emergency situation; and
    overriding, by one or more processors, the recommended CPU clock speed, based at least in part on the identified set of conditions.

4. The method of claim 1, wherein generating the dedicated logical channel from the user device to the multidomain service orchestration layer of the 5G telecom network, further comprises:
    allocating, by one or more processors, bandwidth and quality of service (QoS) class identifier (QCI) values to the dedicated logical channel based at least in part on a service subscription of the user device with virtual network function (VNF).

5. The method of claim 1, wherein identifying the situational insight of the user device based at least in part on the information of the user device, further comprising:
    filtering, by one or more processors, a data stream of the dedicated logical channel using a stream-based classifier; and
    identifying, by one or more processors, a required CPU clock speed of each core of the user device corresponding to services accessed by the user device.

6. The method of claim 1, wherein transmitting the common control channel (CCCH) message to the user device using the medium access control (MAC) protocol, further comprises:
    generating, by one or more processors, control frames for the CCCH message;
    authenticating, by one or more processors, the CCCH message based at least in part on international mobile subscriber identity (IMSI) and temporary mobile subscriber identity (TMSI) numbers of the user device; and
    embedding, by one or more processors, the CCCH message with universally unique identifier (UUID) and IMSI numbers of the user device.

7. A computer program product comprising:
    one or more non-transitory computer readable storage media and program instructions stored on the one or more non-transitory computer readable storage media, the program instructions comprising:
    program instructions to generate a dedicated logical channel from a user device to a multidomain service orchestration layer of a fifth generation (5G) telecom network;
    program instructions to collect information of the user device through the dedicated logical channel;
    program instructions to identify situational insight of the user device based at least in part on the information of the user device, wherein the situational insight includes resource requirements and resource utilization of the user device;
    program instructions to determine a workload forecast of one or more cores of the user device based at least in part on the situational insight;
    program instructions to determine a recommended central processing unit (CPU) clock speed for a CPU core of the user device based at least in part on the workload forecast; and
    program instructions to transmit a common control channel (CCCH) message to the user device using a medium access control (MAC) protocol, wherein the CCCH message includes the recommended CPU clock speed.

8. The computer program product of claim 7, further comprising program instructions, stored on the one or more computer readable storage media, to:
    modify processing clock cycles of the CPU core based at least in part on the recommended CPU clock speed;
    receive an acknowledgement message from the user device, wherein the acknowledgement messages includes utilization information of the CPU core;
    parse the acknowledgement message from the user device; and
    update a machine learning algorithm based on the acknowledgment message.

9. The computer program product of claim 7, further comprising program instructions, stored on the one or more computer readable storage media, to:
    identify a set of conditions of the user device that indicate an emergency situation; and
    override the recommended of the CPU clock speed, based at least in part on the identified set of conditions.

10. The computer program product of claim 7, wherein program instructions to generate the dedicated logical channel from the user device to the multidomain service orchestration layer of the 5G telecom network, further comprise program instructions to:
  allocate bandwidth and quality of service (QoS) class identifier (QCI) values to the dedicated logical channel based at least in part on a service subscription of the user device with virtual network function (VNF).

11. The computer program product of claim 7, wherein program instructions to identify the situational insight of the user device based at least in part on the information of the user device, further comprise program instructions to:
  filter a data stream of the dedicated logical channel using a stream-based classifier; and
  identify a required CPU clock speed of each core of the user device corresponding to services accessed by the user device.

12. The computer program product of claim 7, wherein program instructions to transmit the common control channel (CCCH) message to the user device using the medium access control (MAC) protocol, further comprise program instructions to:
  generate control frames for the CCCH message;
  authenticate the CCCH message based at least in part on international mobile subscriber identity (IMSI) and temporary mobile subscriber identity (TMSI) numbers of the user device; and
  embed the CCCH message with universally unique identifier (UUID) and IMSI numbers of the user device.

13. A computer system comprising:
  one or more computer processors;
  one or more computer readable storage media; and
  program instructions stored on the computer readable storage media for execution by at least one of the one or more processors, the program instructions comprising:
  program instructions to generate a dedicated logical channel from a user device to a multidomain service orchestration layer of a fifth generation (5G) telecom network;
  program instructions to collect information of the user device through the dedicated logical channel;
  program instructions to identify situational insight of the user device based at least in part on the information of the user device, wherein the situational insight includes resource requirements and resource utilization of the user device;
  program instructions to determine a workload forecast of one or more cores of the user device based at least in part on the situational insight;
  program instructions to determine a recommended central processing unit (CPU) clock speed for a CPU core of the user device based at least in part on the workload forecast; and
  program instructions to transmit a common control channel (CCCH) message to the user device using a medium access control (MAC) protocol, wherein the CCCH message includes the recommended CPU clock speed.

14. The computer system of claim 13, further comprising program instructions, stored on the one or more computer readable storage media for execution by at least one of the one or more processors, to:
  modify processing clock cycles of the CPU core based at least in part on the recommended CPU clock speed;
  receive an acknowledgement message from the user device, wherein the acknowledgement messages includes utilization information of the CPU core;
  parse the acknowledgement message from the user device; and
  update a machine learning algorithm based on the acknowledgment message.

15. The computer system of claim 13, further comprising program instructions, stored on the one or more computer readable storage media for execution by at least one of the one or more processors, to:
  identify a set of conditions of the user device that indicate an emergency situation; and
  override the recommended of the CPU clock speed, based at least in part on the identified set of conditions.

16. The computer system of claim 13, wherein program instructions to generate the dedicated logical channel from the user device to the multidomain service orchestration layer of the 5G telecom network, further comprise program instructions to:
  allocate bandwidth and quality of service (QoS) class identifier (QCI) values to the dedicated logical channel based at least in part on a service subscription of the user device with virtual network function (VNF).

17. The computer system of claim 13, wherein program instructions to identify the situational insight of the user device based at least in part on the information of the user device, further comprise program instructions to:
  filter a data stream of the dedicated logical channel using a stream-based classifier; and
  identify a required CPU clock speed of each core of the user device corresponding to services accessed by the user device.

* * * * *